(12) United States Patent
Magagna et al.

(10) Patent No.: US 11,330,331 B2
(45) Date of Patent: May 10, 2022

(54) PROACTIVE DETECTION OF MEDIA ITEM MATCHING

(71) Applicant: GOOGLE LLC, Mountain View, CA (US)

(72) Inventors: Fabio Magagna, Zürich (CH); David Rosenstein, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/627,948

(22) PCT Filed: Dec. 12, 2017

(86) PCT No.: PCT/US2017/065925
§ 371 (c)(1),
(2) Date: Dec. 31, 2019

(87) PCT Pub. No.: WO2019/117880
PCT Pub. Date: Jun. 20, 2019

(65) Prior Publication Data
US 2020/0304867 A1    Sep. 24, 2020

(51) Int. Cl.
*H04N 7/10* (2006.01)
*H04N 21/442* (2011.01)
(Continued)

(52) U.S. Cl.
CPC . *H04N 21/44204* (2013.01); *H04N 21/23418* (2013.01); *H04N 21/2743* (2013.01); *H04N 21/44222* (2013.01)

(58) Field of Classification Search
CPC ....... H04N 21/44204; H04N 21/23418; H04N 21/2743; H04N 21/44222; H04N 21/4408; H04N 21/4788
See application file for complete search history.

(56) References Cited

U.S. PATENT DOCUMENTS 9,723,344 B1    8/2017  Granstrom et al.
2009/0328105 A1*  12/2009  Craner ............... H04N 21/4667
                                                               725/46
(Continued)

FOREIGN PATENT DOCUMENTS

EP    2557782    2/2013
EP    2988513    2/2016
(Continued)

OTHER PUBLICATIONS

International Search Report and Written Opinion for Application No. PCT/US2017/065925, dated Aug. 7, 2018, 17 pages.

*Primary Examiner* — Annan Q Shang
(74) *Attorney, Agent, or Firm* — Lowenstein Sandler LLP

(57) ABSTRACT

A system and method for detection of media items matching is disclosed. In an implementation, the method includes identifying a first media item associated with a channel of a first user; determining whether the first media item qualifies as a candidate reference media item based on properties of the first media item and the channel; analyzing content of the first media item to determine whether a first threshold amount of frames of the first media item does not match with any frame of any previously uploaded media item; selecting the first media item as a reference media item; detecting a subsequently uploaded media item that includes at least a second threshold portion of the reference media item; and providing a graphical user interface (GUI) for presentation to the first user, the GUI including the subsequently uploaded media item and one or more actions to be initiated by the first user.

20 Claims, 6 Drawing Sheets

(51) Int. Cl.
*H04N 21/234* (2011.01)
*H04N 21/2743* (2011.01)

(56) References Cited

U.S. PATENT DOCUMENTS

| | | | |
|---|---|---|---|
| 2012/0158527 A1* | 6/2012 | Cannelongo | H04N 21/2668 705/14.73 |
| 2013/0114864 A1 | 5/2013 | Garcia et al. | |
| 2013/0279690 A1 | 10/2013 | Durham et al. | |
| 2014/0049695 A1* | 2/2014 | Papish | H04N 21/44204 348/731 |
| 2015/0112774 A1* | 4/2015 | Georgoff | G06Q 30/0207 705/14.1 |
| 2015/0235245 A1* | 8/2015 | Shan | G06Q 30/0201 705/7.33 |
| 2015/0379488 A1* | 12/2015 | Ruff | G06Q 40/02 705/36 R |
| 2016/0150281 A1 | 5/2016 | Whaley et al. | |
| 2016/0227266 A1* | 8/2016 | Shaw | H04N 21/472 |
| 2016/0301966 A1 | 10/2016 | Hoder | |
| 2016/0371290 A1 | 12/2016 | Danovitz et al. | |
| 2017/0085518 A1 | 3/2017 | Lord | |
| 2017/0094355 A1* | 3/2017 | McCarty | H04N 21/4335 |
| 2017/0134783 A1 | 5/2017 | Boyle et al. | |
| 2017/0249656 A1* | 8/2017 | Gantner | G06Q 50/01 |
| 2018/0060363 A1* | 3/2018 | Ko | G06Q 50/01 |
| 2019/0034976 A1* | 1/2019 | Hamedi | G06Q 30/0204 |

FOREIGN PATENT DOCUMENTS

| | | |
|---|---|---|
| WO | 2010118152 | 10/2010 |
| WO | 2015017468 | 2/2015 |

* cited by examiner

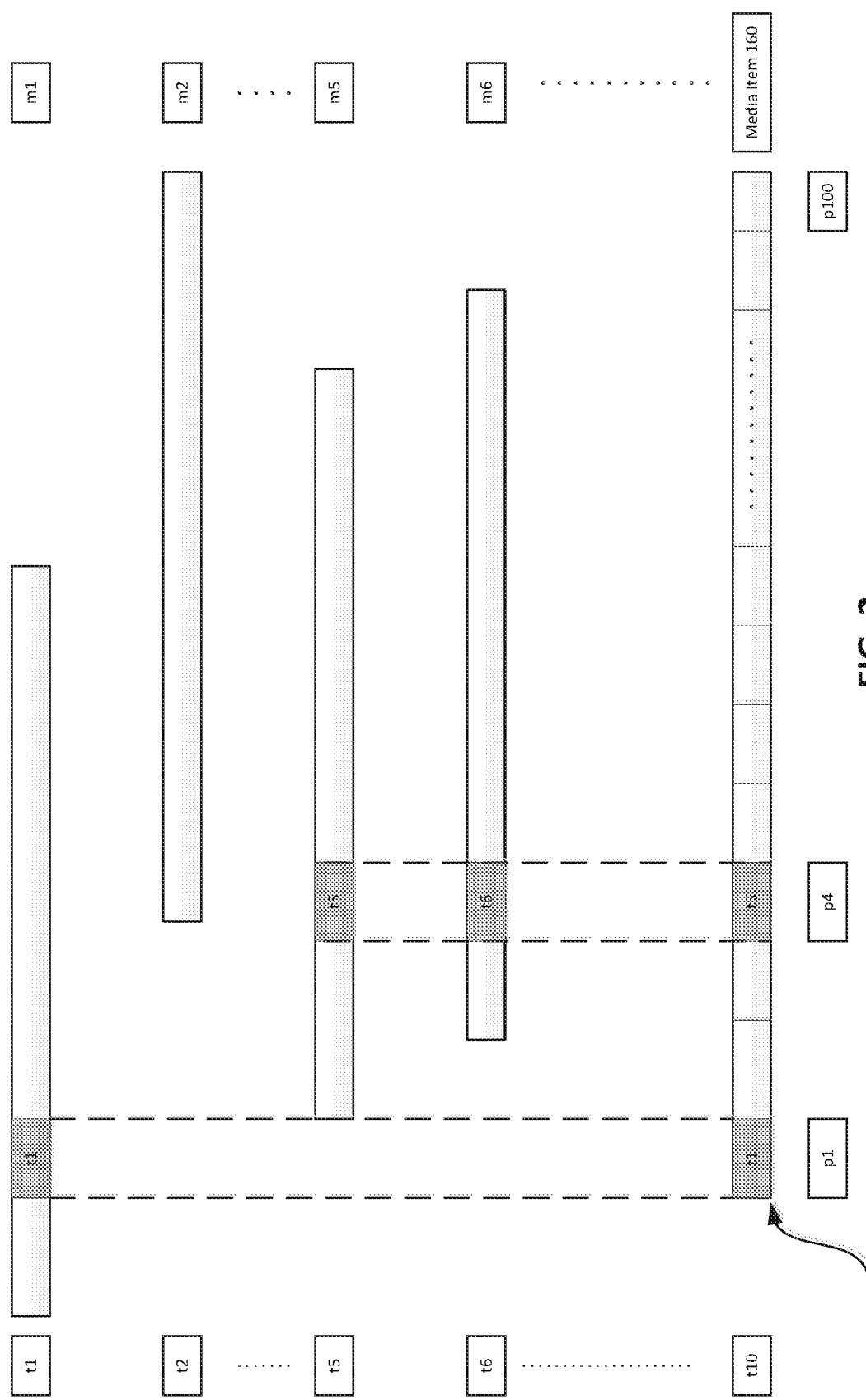

FIG. 3

| Discovered Video | Views | Channel | Reference | Type | Thumbnails | Actions |
|---|---|---|---|---|---|---|
| Butter Cookie Recipe Demonstra.. | 7,462 | Baking World 1.4 K subscribers | Perfect Holiday Butter Cookies | Part | | |
| Cookie recipe collection | 4,433 | Recipe Depot 1,040 subscribers | Perfect Holiday Butter Cookies | Copy | | |
| Holiday Cookies | 2,345 | Holiday Cooking 100 subscribers | Perfect Holiday Butter Cookies | Copy | | |
| Perfect Holiday Cookies | 5,878 | Purrfecto 2,309 subscribers | Perfect Holiday Butter Cookies | Copy | | |
| Bake With Me – Holiday Cookies | 2,010 | Bake With Me 5,903 subscribers | Perfect Holiday Butter Cookies | Part | | |
| Cookies for the holiday | 78 | KSmith409 105 subscribers | Perfect Holiday Butter Cookies | Copy | | |
| Cookies on a budget | 6,049 | Savvy Saver 30.2 K subscribers | DIY Cookie Cutters | Part | | |
| Cookie Cutters | 52 | CutItOut 3 subscribers | DIY Cookie Cutters | Copy | | |
| Cookie Cutter DIY | 2,783 | DIY Heaven 3,046 subscribers | DIY Cookie Cutters | Copy | | |

User Interface 300

PROACTIVE DETECTION OF MEDIA ITEM MATCHING

TECHNICAL FIELD

Aspects and implementations of the disclosure relate to content sharing platforms, and more specifically, to proactively detecting media items matching a reference media item.

BACKGROUND

Content delivery platforms allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a method for proactive detection of media items matching a reference media item is disclosed. The method may include identifying, by a processing device, a first media item associated with a channel of a first user, the channel being hosted on a media platform; determining whether the first media item qualifies as a candidate reference media item based on properties of the first media item and the channel; responsive to determining that the first media item qualifies as a candidate reference media item, analyzing, by the processing device, content of the first media item to determine whether at least a first threshold amount of frames of the first media item does not match with any frame of any previously uploaded media item hosted on the media platform; responsive to determining that at least the first threshold amount of frames of the first media item does not match with any frame of any previously uploaded media item hosted on the media platform, selecting the first media item as a reference media item; detecting a subsequently uploaded media item that includes at least a second threshold portion of the reference media item; and providing a graphical user interface (GUI) for presentation to the first user, the GUI including a media identifier associated with the subsequently uploaded media item and one or more actions to be initiated by the first user with respect to the subsequently uploaded media item.

In some implementations, the properties of the channel may include at least one of subscriber count, activity, age, owner, number of related channels, spam indicator, or media item removal history. Additionally, the properties of the first media item may include length of the first media item. In some implementations, the method may further include determining whether the first media item qualifies as a candidate reference media item comprises determining a qualification score based on the properties of the first media item and the channel.

In some implementations, the method may further include identifying a set of partially matched media items, each media item in the set comprising at least a third threshold portion of the reference media item, wherein the third threshold portion is less than the second threshold portion and the set comprises a first minimum number of media items; and providing to the first user, in the GUI, media identifiers associated with each media in the set of partially matched media items. In some implementations, identifying the set of partially matched media items comprises determining that a second minimum number of media items have been removed from the media platform due to removal requests associated with the reference media item.

In some implementations, the method may further include, prior to selecting the first media item as a reference media item, determining that the first media item does not match with one or more media items identified as one or more excluded media items.

In some implementations, the one or more actions may include sending an electronic notification to the user that uploaded the subsequently uploaded media item, the electronic notification including an attribute associated with the reference media item to be included with the subsequently uploaded media item. In some implementation, the attribute associated with the reference media item may include at least one of a channel identifier, reference media item identifier, link to the channel, link to the reference media item, reference media item statistics, channel statistics, link to other media items on the channel, or option to subscribe to the channel. In some implementations, the attribute associated with the reference media item may not be removable from the subsequently uploaded media item by the user that uploaded the subsequently uploaded media item. In some implementations, the attribute associated with the reference media item may not be removable from the subsequently uploaded media item by a user of the media platform. In some implementations, the one or more actions include initiating a removal request with respect to the subsequently uploaded media item.

In one implementation, a system for proactive detection of media items matching to a reference media item is disclosed. The system may include a memory; and a processing device communicatively coupled to the memory, wherein the processing device is to: identify a first media item associated with a channel of a first user, the channel being hosted on a media platform; determine whether the first media item qualifies as a candidate reference media item based on properties of the first media item and the channel; responsive to determination that the first media item qualifies as a candidate reference media item, analyze content of the first media item to determine whether at least a first threshold amount of frames of the first media item does not match with any frame of any previously uploaded media item hosted on the media platform; responsive to determination that at least the first threshold amount of frames of the first media item does not match with any frame of any previously uploaded media item hosted on the media platform, select the first media item as a reference media item; detect a subsequently uploaded media item that includes at least a second threshold portion of the reference media item; and perform one or more actions initiated by the first user with respect to the subsequently uploaded media item.

In one or more of the disclosed implementations, computing devices for performing the operations of the above described implementations are also disclosed. Additionally, in implementations of the disclosure, a non-transitory machine-readable storage medium stores instructions for performing the operations of the above disclosed implementations.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

FIG. 2 illustrates an example of comparison of content of media items, in accordance with one implementation of the disclosure.

FIG. 3 illustrates an example user interface for proactive detection of media items matching to a reference media item, in accordance with implementations of the disclosure.

DETAILED DESCRIPTION

Figure 1:
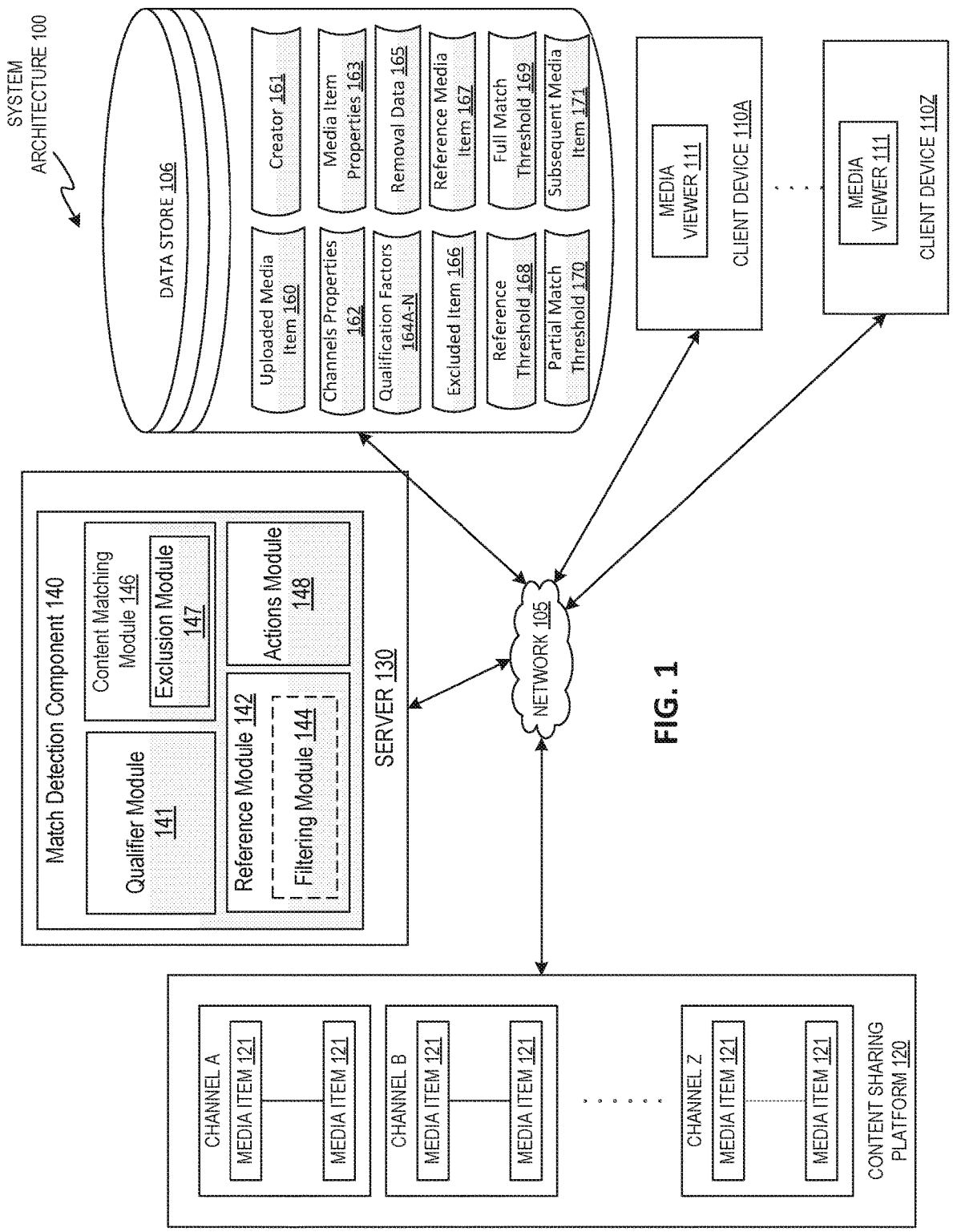
FIG. 1 illustrates an example system architecture, in accordance with one implementation of the disclosure.

A media item, such as a video item, may be uploaded to a media hosting platform (e.g., content sharing platform) by a media owner (e.g., a video creator or a video publisher uploading the video on behalf of the video creator with permission) for consumption by users of the media hosting platform via their user devices. The media owner (who may be a user of the media hosting platform) may desire to prevent other users from uploading media items matching the content of the media owner's media items or impose other limitations on use of the matching media items on the media hosting platform.

Another user, other than the media owner and someone who does not have permission to upload the media item of the media owner, may upload another media item to the media hosting platform. The user uploaded media item (referred herein as a user media item) may be analyzed against a database of various media items, including a media owner's media item to determine if the user media item matches the content of any media items in the database. Based on the content analysis, if it is determined that the user media item matches content of the media owner's media item, the media owner may decide to initiate an action (e.g., remove, mute, block, track, send electronic notification, etc.) on the media hosting platform with regard to the user media item.

Comparison against a media owner's media item may be rooted in a reactive model that necessitates a media owner to take some initiative. In some systems, the comparison may involve defining a match threshold such that a user media item is identified as a matching media item if a quantity of matching video frames exceeds the match threshold, in order to prevent false positive match indications and/or to scale the system appropriately. The media owner may be required to designate a particular media item on the media hosting platform as a reference media item of the media owner, which in turn may be compared against user media items. The media owner may have to identify what part(s) of the reference item is/are the media owner's content. Additionally, the media owner may have to identify rules with respect to how a matching media item may need to be handled, such as, define what percentage of the reference item would have to match with a user media item in order to be provided to the media owner as a matched media item, or what actions to take in which situation.

For some media owners, a reactive model may not provide the level of technical support that is suitable for their needs. The complexity of the reactive model may be a challenge for some users, such as, those users without dedicated resources to identify and designate reference items manually and for each of their media items. Further, with manual designation of reference items, incorrect media items may be erroneously considered to be reference items, and/or some media items that should be considered as reference items may not be designated as such due to manual errors, problems with network connectivity during the designation process may result, etc. Moreover, manually defined rules may not provide accurate results, may become outdated as the system changes and/or may require frequent reviews of results to determine whether the rules should be updated.

Aspects of the present disclosure address the above-mentioned and other challenges by proactively detecting media items as reference media items without user input as well as providing media items matching the selected reference media items without any designation of rules from the users. Without input from the user, it may be challenging for such a proactive system to determine which media items may be selected as a reference item that may be a media owner's own content, and what level of matching is adequate for a particular user. Aspects of the present disclosure address the challenges by identifying a media item that may qualify to be considered as a reference item based on certain properties of the media item, the media owner and the channel associated with the media item indicative of containing original content. Aspects of the present disclosure compare an uploaded media item to all previously uploaded media items to determine whether the user uploading the media item is the first uploader of the media item on the media platform and comparing the media item to all subsequently uploaded media items to determine if the media item has been re-uploaded by another user. For example, aspects of the present disclosure provide for identifying a media item associated with a channel of a first user where the channel is being hosted on a media platform. Whether the first media item qualifies as a candidate reference media item is determined based on properties of the first media item and the channel. If it is determined that the first media item qualifies as a candidate reference media item, content of the first media item is analyzed to determine whether at least a first threshold amount of frames of the first media item does not match with any frame of any previously uploaded media item hosted on the media platform. If it is determined that at least the first threshold amount of frames of the first media item does not match with any frame of any previously uploaded media item hosted on the media platform, the first media item is automatically selected as a reference media item without the first user specifying it as such. A subsequently uploaded media item that includes at least a second threshold portion of the reference media item is then detected. A graphical user interface (GUI) may be presented to the first user, the GUI including a media identifier associated with the subsequently uploaded media item and one or more actions to be initiated by the first user with respect to the subsequently uploaded media item. Once the subsequently uploaded media item matching the reference item is provided to the first user, one or more actions that are initiated by the first user may be performed with respect to the subsequently uploaded media item.

In implementations, the term "matching media items" may refer to an agreement or correspondence in the details, portions, or features between two media items. "Media item matching" may refer to performing a comparison between two media items, or portions of two media items, to determine a similarity between the two media items. The likelihood of match may be a measure of the likelihood that two media items are similar, where 100% likelihood of match may indicate that two media items are likely to be exact match, and 0% likelihood of match may indicate that two media items are likely to be completely different.

In place of manual identification of reference media items and defining rules and threshold for media item matching, aspects of the present disclosure may provide for a match detection component that analyzes properties of a media item and an associated channel, compares the media item to previously uploaded media items to automatically determine a reference item and detecting subsequently uploaded media items matching the reference item. For example, a media owner of a channel (e.g., "Baking with Betty") may initiate uploading a media item (e.g., "Perfect Holiday Butter Cookies") on a media platform. The match detection component may identify the media item associated with the channel of the media owner. The match detection component may determine whether the media item qualifies as a candidate reference media item based on properties of the media item (e.g., whether the media item is at least 30 seconds long, etc.) and properties of the channel (e.g., whether the channel has at least three thousand subscribers, whether at least five or less videos of the media owner have been removed from the media platform as a result of removal request from other users, etc.). If it is determined that the media item qualifies as a candidate reference media item, the match detection component may analyze content of the media item (e.g., "Perfect holiday Cookies") to determine whether at least a first threshold amount (e.g., 90%) of frames of the media item does not match with any frame of any previously uploaded media item hosted on the media platform. If it is determined that at least the first threshold amount of frames of the first media item does not match with any frame of any previously uploaded media item hosted on the media platform, the media owner may be considered to be the first uploader of the media item on the media platform. The match detection component may automatically select the media item as a reference media item. Additionally, the match detection component may determine that the media item is not included in a list of excluded media items (e.g., content of the item that has been marked as another user's content or the media item has been requested to be removed by another user, etc.). The match detection component may then assess subsequently uploaded media items to detect re-uploads of the media item. The match detection component may identify a subsequently uploaded media item (e.g., "Cookie recipe collection") uploaded by another channel (e.g., "Recipe Depot") after the reference media item was uploaded. The match detection component may detect that the subsequently uploaded media item includes at least a second threshold portion (e.g., 80%) of the reference media item. The match detection component may provide a graphical user interface (GUI) for presentation to the media owner, the GUI including a media identifier (e.g., name of the video, link to the video, etc.) associated with the subsequently uploaded media item and one or more actions (e.g., request removal, send electronic notification, etc.) to be initiated by the media owner with respect to the subsequently uploaded media item. Once the media owner selects one of the actions (e.g., send electronic notification), the match detection component may initiate the action (e.g., send a message to the owner of the channel). The process is seamless to the media owner, as the media owner does not have to identify the media item as the reference, identify the segments of the reference to be matched with another media item, and a threshold for content matching with other videos.

Accordingly, aspects of the present disclosure provide for technical solutions to detect matching media items in an accurate and efficient manner. In particular, the technology disclosed herein may accurately identify matching user media items without a media owner identifying a reference media item manually. This increases reliability of the media hosting platform and reduces or eliminates the need for additional operations to identify a reference media item and matching media items. As such, technology disclosed herein results in more efficient use of computing and processing resources and in reduced user input to identify media items from a, typically very large, set of media items. Aspects may address problems associated with processing of large sets of media items to identify particular media items and providing output to a user indicating a state of the set of media items that may prompt the user to interact with the technology.

FIG. 1 illustrates an example system architecture 100, in accordance with one implementation of the disclosure. The system architecture 100 includes client devices 110A through 110Z, a network 105, a data store 106, a content sharing platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores media items, such as video items, or content of segments of the media items. Data store 106 may store one or more data elements, such as, one or more uploaded media item 160, creator 161, channel properties 162, media item properties 163, qualification factors 164A-N, removal data 165, excluded item 166, reference media item 167, reference threshold 168, full match threshold 169, partial match threshold 170, subsequent media item 171, etc.

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130. Additionally, the media viewer 111 may also provide a user interface to allow a user to view and manage reference media items and matching media items, such as the interface described in FIG. 3.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on. Various information from and about the channel may be stored in channel properties 162 in data store 106.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items as electronic files in one or more formats using data store 106. A media item 121 may be stored in the data store 106 as uploaded media item 160, reference media item 167, etc.

Properties of media item 121 may be stored in data store 106 as media item properties 163.

In one implementation, the server 130 may be one or more computing devices (e.g., a rackmount server, a server computer, etc.). The server 130 may be included in the content sharing platform 120, be an independent system or be part of another system/platform. The server 130 may include a match detection component 140.

In one implementation, a user media item and a reference media item which are matched by the match detection component 140 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In one implementation, fingerprints of a video item may be fingerprints of the video component of the video item. In other implementations, fingerprints of a video item may be fingerprints of the audio component of the video item. In yet other implementations, fingerprints of a video item may be fingerprints of both the video component and audio component of the video item.

The match detection component 140 may enable the detection of a matching between a user media item that is uploaded to the content sharing platform 120 (e.g., as part of a channel or an independent media item), and a media item that is selected by the match detection component 140 as a reference media item and uploaded to the content sharing platform 120 (e.g., as part of a channel or an independent media item). The match detection component 140 may be executed as a result of an ad hoc initiation, as a result of a scheduled initiation, and/or a as a result of a continuous execution at specified frequency. The match detection component 140 may include a qualifier module 141, a reference module 142, a content matching module 146, and an actions module 148. The reference module 142 may further include a filtering module 144, which may be part of the reference module 142, or external to the reference module 142, as indicated by the dotted lines. For example, filtering module 144 may instead be part of the qualifier module 141. Content matching module 146 may further include an exclusion module 147.

In one implementation, the match detection component 140 enables the detection of a matching between the user media item and the reference media item without any input from the media owner. The match detection component 140 and its modules and sub-modules may use various data elements (e.g., data elements 160-171) stored in data store 106 in performing the operations as described in the present disclosure. Each of the data elements 160 through 171 may represent one or more of the data elements.

In one implementation, qualifier module 141 of match detection component 140 may identify a media item associated with a channel of a user, where the channel is hosted on a media platform. For example, qualifier module 141 may identify an uploaded media item 160 associated with a channel A of creator 161, where the channel is hosted on content sharing platform 120.

In some implementations, qualifier module 141 may determine whether the media item qualifies as a candidate reference media item based on properties of the first media item and the channel. For example, qualifier module 141 may determine whether uploaded media item 160 qualifies as a candidate reference media item based on properties of the uploaded media item 160 and channel A. Properties of uploaded media item 160 may be stored in media item properties 163 in data store 106. Properties of channel A may be stored in channel properties 162 in data store 106.

In some implementations, the channel properties 162 may include subscriber count, activity, age, owner, number of related channels, spam indicator, or media item removal history etc. associated with channel A. In some examples, media item properties 163 may include length of media item 160 (e.g., whether the media item is at least 30 seconds long, etc.), file size of media item 160, number of frames in media item 160, etc.

In some implementations, qualifier module 141 may determine whether the first media item qualifies as a candidate reference media item by determining a qualification score based on the properties of the media item and the channel. In an example, a qualification score may be used to indicate likelihood that a media owner is the first uploader of the media item. The likelihood may be derived using one or more properties of the media item and the channel. In the absence of a user specifying a reference item, the qualification score may be used to prevent selecting a reference item that is not the media owner's media item. The qualification score may take into consideration factors that are reflective of a media owner or a channel's credibility or trustworthiness.

The qualification score may take into consideration a single factor or multiple factors. The factors may be stored in qualification factors 164A-N. For example, a user whose sign up country is indicated as Country A, but whose usage information comes from a Country B, may indicate less credibility. In another example, if a channel has a significant number of media items that have been removed from the media platform as a result of removal request from other users, it may indicate that the channel may be prone to upload or re-upload media items of other users. In another example, multiple accounts may have been created by the same user at the same time, which may indicate some automated account creation activities and may not be related to a credible user. In another example, a user or channel may be associated with uploading too many spam items, which may indicate lower likelihood of uploading original content.

A qualification score may be assigned for each of the factors considered. In some implementations, some of the factors may carry more weight than others. Additionally, an overall score may be calculated by multiplying the score from each factor by the corresponding weight, and, optionally, diving by the total number of factors used. The overall score may be used when an aggregate of factors are to be assessed by qualifier module 141.

In some implementations, the qualification score may provide a likelihood, such as, a likelihood that the candidate media item is a first uploaded video (e.g., a 60% likelihood that the video contains original content). In other implementations, the qualification score may provide a definitive assessment, such as, whether a media item can qualify as a first uploader or not. In an example, based on the qualification factors 164A-N, a qualification score may be aggregated for uploaded media item 160. Qualifier module 141 may determine whether uploaded media item 160 qualifies as a candidate reference media item based on the aggregated qualification score based on the media item properties 163 of the uploaded media item and the channel properties 162 of channel A.

For example, qualifier module 141 may be used to determine likelihood of the uploaded media item 160 to match the reference media item. Factor analyzer 146 may use one or more factors 169A-N to determine the likelihood of match. In some implementations, the one or more factors may include at least one of a channel age, channel owner, number of related channels of the channel owner, channel traffic, number of channel subscribers, channel activity, size of media item, or audio to video ratio. For example, a very young channel may be more likely to produce a matching media item than an established channel that has not been taken action against. In another example, a channel owner having a high number of channels may indicate likelihood to produce media items matching a reference media item. For example, media item size being similar to reference media item may indicate higher likelihood of match. In some implementations, each of the factors may be assigned a particular weight. Some factors may carry more weight, while some may carry less weight assigned to them. An overall score may be calculated by multiplying the likelihood from each factor associated with a media item by the corresponding weight, and, optionally, diving by the total number of factors used. The overall score may be used when an aggregate of factors are desired to be applied to the additional media item.

In some implementations, qualifier module 141 may assess number of successful removal requests submitted by media owner or associated channel. A high number of successful removal requests may indicate a higher likelihood that the media owner's media items are more likely to be considered original content. Additionally, this may also indicate a higher need for the media owner to identify matching media items.

In an implementation, if it is determined that the media item qualifies as a candidate reference media item, reference module 142 may analyze content of the media item to determine whether the media item is a first upload of the content on the media platform. Reference module 142 analyzes the content by determining whether at least a first threshold amount of frames of the first media item does not match with any frame of any previously uploaded media item hosted on the media platform. Reference module 142 may compare uploaded media item 160 to all previously uploaded media items on the media platform which have been uploaded prior to the uploading of media item 160.

For example, every media item having an upload timestamp earlier than the upload timestamp of media item 160 may be considered for comparison. Each frame of the media item 160 may be compared to each frame of each previously uploaded media items. For each candidate frame of the media item 160, reference module 142 may determine whether there is any match with any other frames of any of the previously uploaded media items. If there is any match with any other frame of previously uploaded media items, the candidate frame is considered as one frame with existing matching content and a counter of reference module 142 may be updated to track the number of matches. Each frame of the media item 160 may be compared following the same operations, and for every match, the counter may be updated. After comparing all frames of the media item 160, reference module 142 may determine the number of frames of the media item 160 indicates a match with previously uploaded media items.

The amount of matching frames may be compared to the reference threshold. For example, a reference threshold 168 (e.g., a number, a percentage, etc.) may be specified in data store 106 for use by reference module 142. In an example, the reference threshold may be specified as 90%. Reference module 142 may determine whether at least 90% of frames of the first media item does not match with any frame of any previously uploaded media item hosted on the media platform. Responsive to determining that at least 90% of frames of the media item 160 does not match with any frame of any previously uploaded media item hosted on the media platform, reference module 142 may select the first media item as a reference media item 167 and store in data store 106.

In another implementation, reference module 142 may analyze content of the media item by determining content age of each defined portion of the media item and comparing the content age to the upload time of the media item 160. For example, as shown in FIG. 2, media item 160 (as also represented by media item 202) may be divided into 1 second portions. In an example, media item 160 may be 100 seconds long. Media item 160 may be divided into 100 one second portions. Media item 160 may be uploaded at time t10. Media item 160 may be compared to all other media items uploaded on the media host prior to t10 and the content age of a portion of media item may be set to the earliest content age of matching content of previously uploaded media items. For example, the earliest time a previously uploaded media item m1 was uploaded may have been at time t1. Similarly, media items m2-m9 may have been uploaded at time t2-t9, respectively, where t1 is earlier than t2, t2 is earlier than t3, etc. The content of each one second portion of media item 160 may be compared to the contents of media items m1-m9. For example, content of portion p1 of media item 160 may be compared to content of one-second portions of media item m1. If any portion of m matches with portion p1 of media item 160, then the content age of portion p1 may be set to the content age of media item m1 (which is t1). Thus, content age of portion p1 is t1, even though media item 160 was uploaded at time t10. Following the same method, all remaining portions p2-p100 may be compared to media items m1-m9. If, for example, portion p4 matches with a portion of m6 and m5, then content age of p4 is set to t5 (corresponding to earliest upload time t5 of m5). Reference module 142 may determine content age of all portions of media item 160 in the same manner. In an example, if it is determined that 90% (e.g., the reference threshold) of the portions, which equals to 90 seconds of the media item 160, has the same content age as the media item 160 (e.g., t10, or within an acceptable margin of error specified by reference module 142), then reference module 142 may determine that the content age of media item 160 is current. That is, the content of media item 160 may be considered to be original content, or uploaded for the first time in media item 160 on the media platform. Responsive to the determination that media item 160 has a content age considered to be largely the same as its upload time, media item 160 may be selected by the reference module 142 as reference media item 167.

In some implementations, reference module 142 may perform filtering of subsequently uploaded media items to ensure that an appropriate media item is selected as a reference item. The filtering may be performed by the filtering module 144, which may be part of the reference module 142, or part of another module (e.g., qualifier module 141), or an independent module. In some implementations, the filtering module 144 may determine whether the selected media item matches with one or more media items identified as one or more excluded media items. For example, the filtering module 144 may determine whether media item 160 matches with a media item identified as an excluded item 166 in data store 106. In an example, excluded item 166 may include one or more of media items that have been indicated as another media owner's media item(s), or a media item that has been requested to be removed by another user. In another example, the content may have been marked as content that belongs in public domain (e.g., identified as not owned by any entity). If the filtering module 144 determines that media item 160 is included in the excluded item 166, then media item 160 may not be selected as reference media item 167. If the filtering module 144 determines that media item 160 is not included in the excluded item 166, then media item 160 may be selected as reference media item 167.

Once a reference item has been automatically selected, match detection component may detect media items matching the reference media item. In one implementation, content matching module 146 may detect a subsequently uploaded media item that includes at least a second threshold portion of the reference media item. For example, content matching module 146 may compare reference media item 167 to all media items uploaded subsequent to the upload time of the reference media item 167. Content matching module 146 may perform the comparison on an ad hoc basis, on a specified frequency (e.g., every 7 days), or on any other specified interval. Content matching module 146 may compare media items uploaded between a specified time period (e.g., last one month, from a start date to an end date, etc.). In some implementations, content matching module 146 may compare the reference media item to media items with a minimum viewership (e.g., at least 100 views). Content matching module may use other media item and channel properties to limit matching results.

Content matching module 146 may detect a subsequently uploaded media item that includes at least a threshold portion of the reference media item, where the threshold portion may be identified as the full match threshold 169. The full match threshold may be used to identify media items that have nearly identical content. For example, full match threshold 169 may be set as 90%. In such a case, content matching module 146 may detect a subsequently uploaded media item (e.g., subsequent media item 171) that includes at least 90% of the content of the reference media item. In another example, full match threshold may be 100%, and in such a case, content matching module 146 may detect only those media items that include 100% of the reference media item.

In some implementations, content matching module 146 may detect a subsequently uploaded media item that is considered a partial match (e.g., considered less than an exact match). For example, content matching module 146 may identify media items that each includes at least another threshold portion of the reference media item identified as a partial match threshold 170, wherein the value of the partial match threshold 170 is less than the value of the full match threshold 169. For example, partial match threshold 170 may be set as 40%. That is, a media item may be considered a partial match of reference media item 167 if 40% of the reference media item 167 is included in the media item.

The content matching module 146 may assess other additional aspects, such as number of media items meeting the partial match threshold, number of successful media item removal based on removal requests from the media owner, etc. The content matching module 146 may identify the additional aspects for ensuring that content meeting a low threshold is nevertheless media content that may be pertinent for the media owner. If a media owner has a significant number of partial matches, or has a significant number of removals against his/her media items, it may indicate that the particular media owner has a higher likelihood of media items matching the reference and would benefit more from being informed of partial matches. The content matching module 146 may identify a set of partially matched media items, where a minimum number (e.g., 10) of media items meet the partial match threshold (e.g., 40%). In another example, the content matching module 146 may identify a set of partially matched media items, where a second minimum number (e.g., 5) of media items have been successfully removed from the media platform due to removal requests associated with the reference media item 167. The content matching module 146 may determine the number of removals of media items that were considered a full match, and another number of removal for media items that were considered a partial match. The information may be used in determining the list of media item matches to show on the interface, as will be described with respect to FIG. 3.

In some implementations, an exclusion module 147 may filter out media items matching the reference media item. Exclusion module 147 may be fed the list of media items matching the reference media item 167, and determine whether the media items are to be filtered out of the matching media item result shown to the media owner. For example, if it is determined that subsequent media item 171 is identified as a deleted, inactivated, or otherwise excluded media item, then subsequent media item 171 may not be provided to the media owner for review. In another example, subsequent media item 171 may be determined to be of the same media owner as the reference media item 167, or the channel associated with the media owner. In such a case, the exclusion filter may determine to exclude the media item from the result set of matching media items to the reference media item.

A module of the match detection component 140, such as content matching module 146 or actions module 148, may provide a graphical user interface (GUI) for presentation to the media owner (e.g., creator 161). The GUI may include a media identifier (e.g., name of a video, link to a video, etc.) associated with the subsequent media item 171 that has been determined to match with the reference media item 167. Alternatively, the subsequent media item 171 may be sent to the media owner though an electronic communication (e.g., via a message center within the system 100, or via an external email address). The GUI, or the electronic communication, may include the matching media item and one or more actions to be initiated by the media owner with respect to the subsequently uploaded media item.

In one example, the actions module 148 (or content matching module 146) may present the matching one or more subsequent media item(s) 171 to creator 161 using an interface depicted in FIG. 3. In some implementation, the actions module 148 may be used to initiate an action with respect to the matching subsequent media item(s) 171. The actions module 148 may receive one or more actions from media owner from the GUI and perform the one or more actions with respect to the subsequent media item(s) 171. For example, the media owner may initiate an action to request removal of subsequent media item 171. Actions module 148 may receive the request, and initiate subsequent operations necessary to remove the media item. The actions offered by or processed by actions module 148 will be discussed in conjunction with the discussion of the GUI as illustrated in FIG. 3.

FIG. 3 illustrates an example user interface 300 for providing matching media items to media owners and corresponding actions that the media owner can initiate. For example, the user interface 300 may correspond to a user interface presented by one of the respective media viewers 111 of the client device 110. The interface 300 may provide a list of media items for the media owner's review and to initiate one or more actions. For example, the user interface 300 may include a column 302 for discovered video, which may provide the matching subsequent media item 171 to the media owner (e.g., creator 161). For example, the user interface 300 may include a column 303 for number of views of the discovered video, 304 for channel of the discovered video, column 305 for depicting the reference media item corresponding to the discovered video, column 306 for thumbnails related to the discovered video, and a column 307 for a set of available actions. In one example, a column 3210 may indicate the type of match for the discovered video, such as a full match ("copy") or a partial match ("part"). In an example, available actions on the example interface 300 includes an allow button 310, a notification button 312, and a request removal button 314. One or more media items are shown as discovered video items matching the reference media item and a scrollbar 316 indicates availability of additional discovered videos. A date filtering button 324 provides the media owner the option to view matches generated by specified time period. The user may indicate the time period by clicking the button 324 and specifying a start and end date, or a period such as "last week," etc. As a result, matching media items that have been uploaded within the specified time period may be presented in the discovered video column.

In an example, the interface 300 may present a list of discovered videos that only have full matches with the reference media item. The determination may be based on various aspects. For example, if the number of successful removals requested by media owners for media items with full match is over a certain threshold, the system may provide the media owner access to a selected number of partial matches. In another example, if the number of successful removals requested by media owners for media items with partial matches is over a certain other threshold, the system may provide the media owner access to all partial matches detected. For example, interface 300 shows both full and partial matches, as indicated in column 320.

As illustrated in FIG. 3, for example, discovered videos matching with reference media item "Perfect Holiday Butter Cookies" in column 305 by the media owner on channel "Baking with Betty" are provided in column 302. Media owner can monitor the view count in column 303, channel owner information in 304, and representative thumbnails of the candidate videos in column 306 to make a decision to initiate ac action from Action 307.

In some implementations, available actions may fall into various categories. For example, available actions may include actions to protect the media owner's media item by requesting removal of the matching media item, actions to promote media owner's media items by accessing a new audience that the media owner may be able to target through the matching media item, and actions to do nothing either for the moment or permanently.

In one example, available actions may include initiating a removal request with respect to the subsequently uploaded media item. In some implementations, the interface may provide an option to remove a media item from the list of media items to review. For example, the media owner may review the provided media items and decide to request removal of media item "Cookies for the holiday" by channel "KSmith409" by clicking the button 316 corresponding to the listing of the video. There may be an option to request an "immediate removal," and if the media owner chooses the option, the actions module 148 may receive the action and immediately initiate the removal process with respect to the video "Cookies for the holiday." In another example, the media owner may decide to choose an option for "delayed removal" to give advance notice to the channel "Holiday Cooking" so that the owner of the channel may remove the video on his/her own without being penalized. After a specified time, if the video is not removed from the media platform, the actions module 148 may initiate the removal process after passage of a delay period. In some implementations, there may be an option for selecting multiple videos on the interface 300 and request a "bulk removal" action to initiate removal of all selected videos.

In some implementations, interface 300 may provide available actions to promote media owner's media items by accessing a new audience that the media owner may be able to target through the matching media item. The actions may include sending an electronic notification to the user that uploaded the discovered media item including a request to give credit to the media owner in some form. For example, the media owner may decide to send a notification to the owner of "Butter Cookie Recipe Demonstration" for channel "Baking World" with 1.4K subscribers. The media owner may click on email button 312 to initiate such electronic communication. The notification may be editable and the media owner may write to the user to collaborate, or request to give the media owner credit by including his/her media item link with the discovered video.

In some implementation, the notification may provide the media owner option to include one or more attributes associated with the reference media item to be included with the discovered video. In some implementations, the attribute associated with the reference media item may include a channel identifier, reference media item identifier, link to the channel, link to the reference media item, reference media item statistics, channel statistics, link to other media items on the channel, or option to subscribe to the channel. The owner of the discovered video may be given the option to accept or reject the request for attribution. If the request is accepted, actions module 148 may embed the chosen attributes with the discovered media item. In some implementations, the embedded attribute may not be editable or removable from the discovered video by the user that uploaded the discovered video, or by any end user of the media platform. Embedding an attribute of the media owner's media item may provide access to a new audience for the media owner. Alternatively, if the request for attribution is rejected, media owner may initiate a different action from the available options. In some implementations, if the request for attribution is not accepted within a specified number of days, or is rejected, the actions module 148 may initiate an "immediate removal" or a "delayed removal," as discussed above.

In one example, the media owner may decide to allow usage of the discovered video "cookies on a budget" uploaded by user "Savvy Saver" by clicking on the allow button 310. "Allowing" may indicate that the media item may continue to remain on the media hosting platform. In another example, the media owner may be given an option on the interface to archive the discovered video for initiating an action at a later time by clicking in an archive button (not shown). In some implementations, the interface may provide an option to remove a media item from the list of media items to review permanently. The actions module 148 may receive one or more of these actions from media owner and perform the one or more actions with regards to the one or more discovered videos.

In general, functions described in one implementation as being performed by the content sharing platform 120, or server 130 can also be performed on the client devices 110A through 110Z in other implementations, if appropriate. In addition, the functionality attributed to a particular component can be performed by different or multiple components operating together. The content sharing platform 120 or server machine 130 can also be accessed as a service provided to other systems or devices through appropriate application programming interfaces, and thus is not limited to use in websites.

Although implementations of the disclosure are discussed in terms of content sharing platforms, implementations may also be generally applied to any type of media hosting platform providing connections between users, or content delivery platform. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 4:
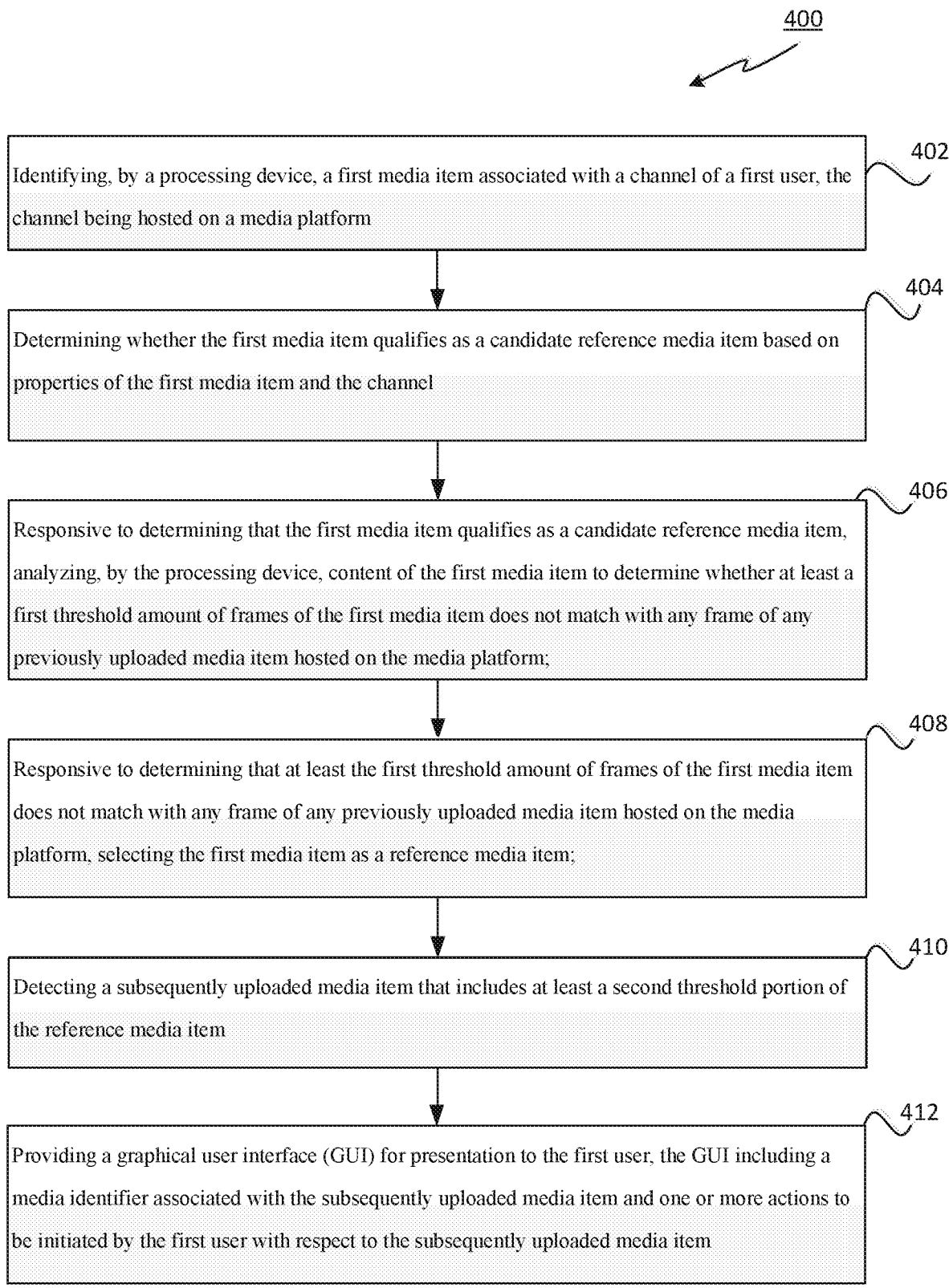
FIG. 4 depicts a flow diagram of one example of a method for proactive detection of media items matching to a reference media item, in accordance with implementations of the disclosure.
Figure 5:
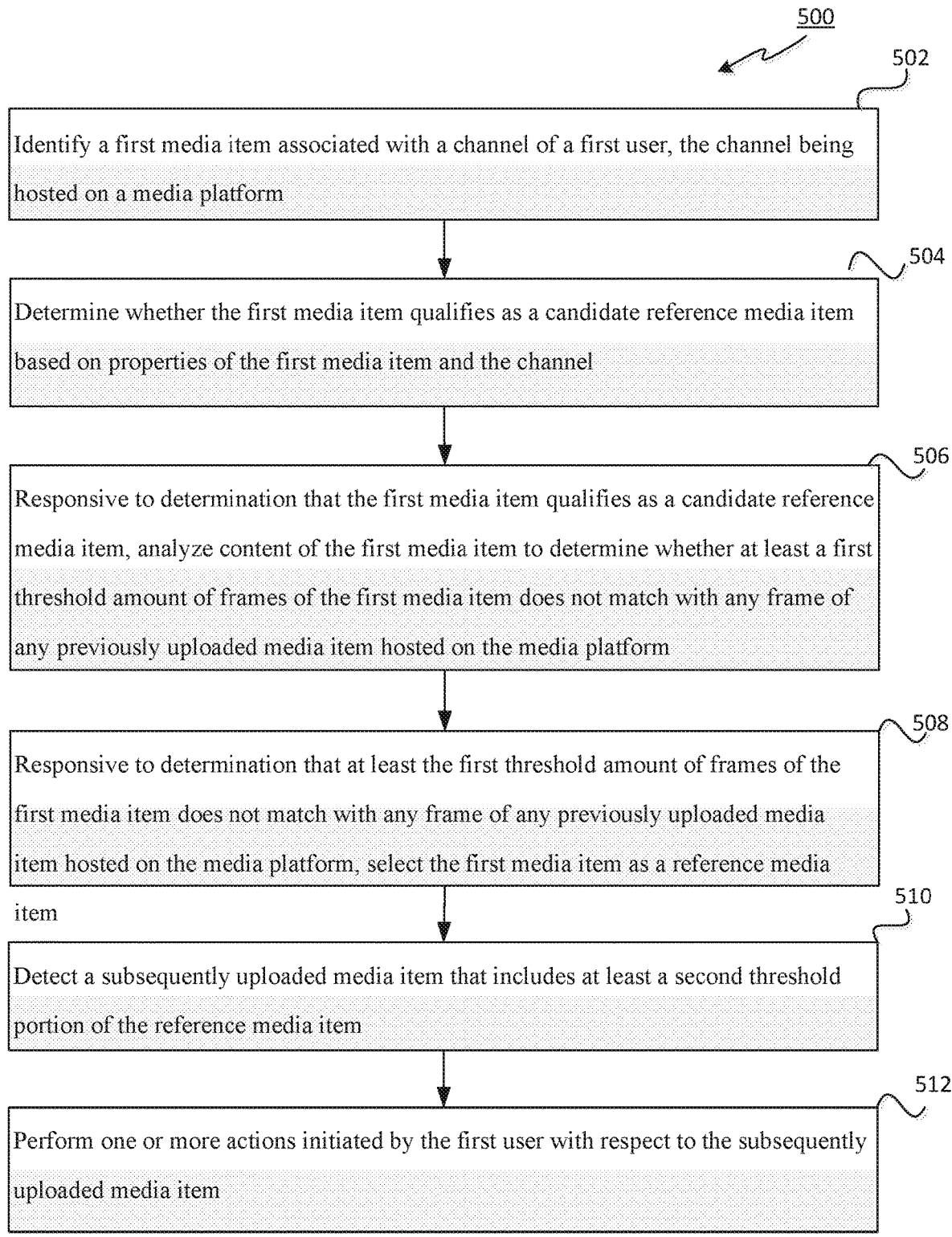
FIG. 5 is a flow diagram of one example of a method for performing an action responsive to proactive detection of media items matching to a reference media item, in accordance with an implementation of the disclosure.

FIG. 4 is a flow diagram illustrating a method 400 for proactive detection of media items matching to a reference media item in accordance with an implementation of the disclosure. FIG. 5 is a flow diagram illustrating a method 500 for performing an action responsive to proactive detection of media items matching to a reference media item in accordance with an implementation of the disclosure. The methods 400 and 500 may be performed by processing logic that includes hardware (e.g., circuitry, dedicated logic, programmable logic, microcode, etc.), software (e.g., instructions run on a processing device to perform hardware simulation), or a combination thereof. In one implementation, the methods 400 and 500 may each be performed by a processing device executing the match detection component 140 as described with respect to FIGS. 1-3.

Referring to FIG. 4, the method 400 begins at block 402 when a processing device may identify a first media item associated with a channel of a first user, the channel being hosted on a media platform.

At block 404, the processing device may determine whether the first media item qualifies as a candidate reference media item based on properties of the first media item and the channel. In some implementations, the properties of the channel may include at least one of subscriber count, activity, age, owner, number of related channels, spam indicator, or media item removal history. Additionally, the properties of the first media item may include length of the first media item.

At block 406, the processing device may, responsive to determining that the first media item qualifies as a candidate reference media item, analyze content of the first media item to determine whether at least a first threshold amount of frames of the first media item does not match with any frame of any previously uploaded media item hosted on the media platform. In another implementation, the processing device may analyze content of the first media item by determining content age of each portion of the first media item and comparing the content age to the upload time of the first media item. Content age may be determined based on a comparison of content of the first media item and all previously uploaded media items, and selecting the upload time of the earliest matching content on the platform.

At block 408, the processing device may, responsive to determining that at least the first threshold amount of frames of the first media item does not match with any frame of any previously uploaded media item hosted on the media platform, select the first media item as a reference media item.

At block 410, the processing device may detect a subsequently uploaded media item that includes at least a second threshold portion of the reference media item. In some implementations, the method may further include identifying a set of partially matched media items, each media item in the set comprising at least a third threshold portion of the reference media item, wherein the third threshold portion is less than the second threshold portion and the set comprises a first minimum number of media items; and providing to the first user, in the GUI, media identifiers associated with each media in the set of partially matched media items. In some implementations, identifying the set of partially matched media items comprises determining that a second minimum number of media items have been removed from the media platform due to removal requests associated with the reference media item.

At block 410, the processing device may provide a graphical user interface (GUI) for presentation to the first user, the GUI including a media identifier associated with the subsequently uploaded media item and one or more actions to be initiated by the first user with respect to the subsequently uploaded media item. In some implementations, the one or more actions may include sending an electronic notification to the user that uploaded the subsequently uploaded media item, the electronic notification including an attribute associated with the reference media item to be included with the subsequently uploaded media item. In some implementation, the attribute associated with the reference media item may include at least one of a channel identifier, reference media item identifier, link to the channel, link to the reference media item, reference media item statistics, channel statistics, link to other media items on the channel, or option to subscribe to the channel. In some implementations, the attribute associated with the reference media item may not be removable from the subsequently uploaded media item by the user that uploaded the subsequently uploaded media item. In some implementations, the attribute associated with the reference media item may not be removable from the subsequently uploaded media item by a user of the media platform. In some implementations, the one or more actions include initiating a removal request with respect to the subsequently uploaded media item.

FIG. 5 depicts a flow diagram illustrating a method 500 for performing an action responsive to media item matching using search query analysis in accordance with an implementation of the disclosure. At block 502, a first media item associated with a channel of a first user may be identified, the channel being hosted on a media platform. At block 504, it may be determined whether the first media item qualifies as a candidate reference media item based on properties of the first media item and the channel. In some implementations, the method may further include determining whether the first media item qualifies as a candidate reference media item comprises determining a qualification score based on the properties of the first media item and the channel.

At block 506, responsive to determination that the first media item qualifies as a candidate reference media item, content of the first media item may be analyzed to determine whether at least a first threshold amount of frames of the first media item does not match with any frame of any previously uploaded media item hosted on the media platform. In another implementation, content of the first media item may be analyzed by determining content age of each portion of the first media item based on comparing content with previously uploaded media item and comparing the determined content age to the upload time of the first media item.

At block 508, responsive to determination that at least the first threshold amount of frames of the first media item does not match with any frame of any previously uploaded media item hosted on the media platform, the first media item may be select as a reference media item. In some implementations, prior to selecting the first media item as a reference media item, it may be determined that the first media item does not match with one or more media items identified as one or more excluded media items.

At block 510, a subsequently uploaded media item that includes at least a second threshold portion of the reference media item may be detected. At block 512, one or more actions initiated by the first user with respect to the subsequently uploaded media item may be performed. In some implementations, one or more actions may include an option to request an "immediate removal," and if the media owner chooses the option, a removal process with respect to the video may be immediately initiated. In another example, one or more actions may include an option to request "delayed removal." After a specified time, if the video is not removed from the media platform, the removal process may be initiated after passage of a delay period.

Figure 6:
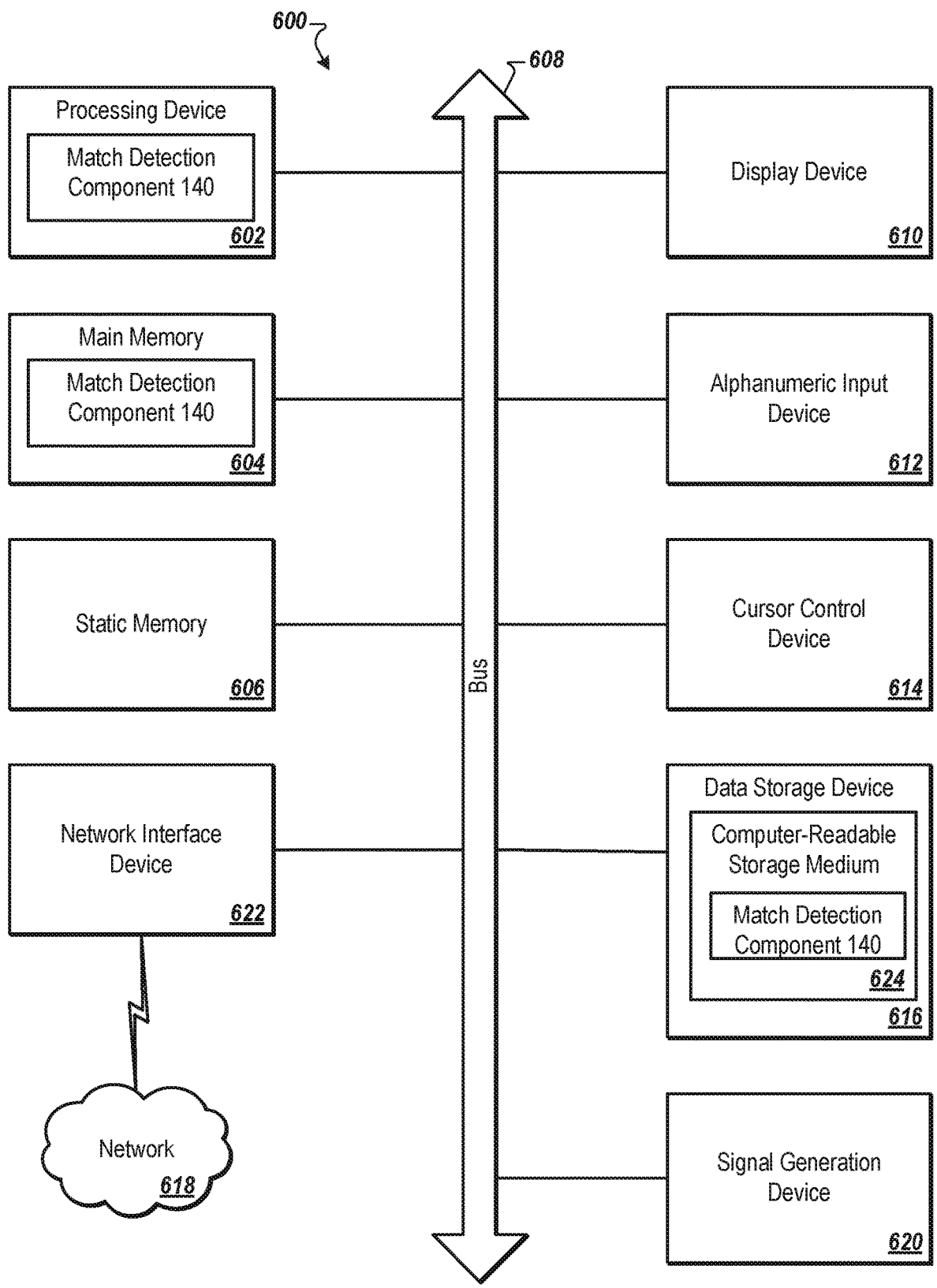
FIG. 6 is a block diagram illustrating an exemplary computer system, in accordance with an implementation of the disclosure.

FIG. 6 is a block diagram illustrating an exemplary computer system 600. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of match detection component 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the match detection component 140 for performing the operations and steps discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and match detection component 140 embodying any one or more of the methodologies or functions described herein. The sets of instructions of the system architecture 100 and match detection component 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "comparing", "determining", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
    determining, by a processing device, that a first media item associated with a channel of a channel owner on a media platform is to be used as a reference media item for comparison with other media items to detect any of the other media items that matches the reference media item, wherein determining that the first media item is to be used as the reference media item is performed without user input identifying the first media item as the reference media item, and comprises:
        determining whether the first media item qualifies as a candidate reference media item based on properties of the first media item and the channel;
        responsive to determining that the first media item qualifies as a candidate reference media item, analyzing, by the processing device, content of the first media item to determine whether the content of the first media item is to be considered as a first content upload to the media platform, wherein determining whether the content of the first media item is to be considered as the first content upload to the media platform is based on whether at least a first threshold amount of frames of the first media item lacks a match with any frame of any previously uploaded media item hosted on the media platform; and
        responsive to determining that the content of the first media item is to be considered as the first content upload to the media platform, selecting the first media item as the reference media item;
    upon determining, without the user input identifying the first media item as the reference media item, that the first media item is to be used as the reference media item, detecting a subsequently uploaded media item that includes at least a second threshold portion of the reference media item identified without the user input; and
    providing a graphical user interface (GUI) for presentation to the channel owner, the GUI including a media identifier associated with the subsequently uploaded media item and one or more actions to be initiated by the channel owner with respect to the subsequently uploaded media item.

2. The method of claim 1, wherein the properties of the channel includes at least one of subscriber count, activity, age, owner, number of related channels, spam indicator, or media item removal history.

3. The method of claim 1, wherein determining whether the first media item qualifies as a candidate reference media item comprises determining a qualification score based on the properties of the first media item and the channel.

4. The method of claim 1, wherein the properties of the first media item include length of the first media item.

5. The method of claim 1, further comprising:
identifying a set of partially matched media items, each media item in the set comprising at least a third threshold portion of the reference media item, wherein the third threshold portion is less than the second threshold portion and the set comprises a first minimum number of media items; and
providing to the channel owner, in the GUI, media identifiers associated with each media in the set of partially matched media items.

6. The method of claim 5, identifying the set of partially matched media items comprises determining that a second minimum number of media items have been removed from the media platform due to removal requests associated with the reference media item.

7. The method of claim 1, further comprising:
prior to selecting the first media item as the reference media item, determining that the first media item does not match with one or more media items identified as one or more excluded media items.

8. The method of claim 1, wherein the one or more actions include sending an electronic notification to a user that uploaded the subsequently uploaded media item, the electronic notification including an attribute associated with the reference media item to be included with the subsequently uploaded media item.

9. The method of claim 8, wherein the attribute associated with the reference media item includes at least one of a channel identifier, reference media item identifier, link to the channel, link to the reference media item, reference media item statistics, channel statistics, link to other media items on the channel, or option to subscribe to the channel.

10. The method of claim 8, wherein the attribute included with the subsequently uploaded media item is not removable from the subsequently uploaded media item by the user that uploaded the subsequently uploaded media item.

11. A system comprising:
a memory; and
a processing device, coupled to the memory, to:
determine that a first media item associated with a channel of a channel owner on a media platform is to be used as a reference media item for comparison with other media items to detect any of the other media items that matches the reference media item, wherein to determine that the first media item is to be used as the reference media item, the processing device is further, without user input identifying the first media item as the reference media item, to:
determine whether the first media item qualifies as a candidate reference media item based on properties of the first media item and the channel;
responsive to determination that the first media item qualifies as a candidate reference media item, analyze content of the first media item to determine whether the content of the first media item is to be considered as a first content upload to the media platform, wherein determining whether the content of the first media item is to be considered as the first content upload to the media platform comprises determining whether at least a first threshold amount of frames of the first media item does not match with any frame of any previously uploaded media item hosted on the media platform; and
responsive to determining that the content of the first media item is to be considered as the first content upload to the media platform, select the first media item as the reference media item;
upon determining, without the user input identifying the first media item as the reference media item, that the first media item is to be used as the reference media item, detect a subsequently uploaded media item that includes at least a second threshold portion of the reference media item; and
perform one or more actions initiated by the channel owner with respect to the subsequently uploaded media item.

12. The system of claim 11, wherein to determine whether the first media item qualifies as a candidate reference media item, the processing device is to:
determine a qualification score based on the properties of the first media item and the channel.

13. The system of claim 11, wherein the processing device is further to:
prior to selecting the first media item as the reference media item, determine that the first media item does not match with one or more media items identified by the system as one or more excluded media items.

14. The system of claim 11, wherein the properties of the channel includes at least one of subscriber count, activity, age, owner, number of related channels, spam indicator, or media item removal history.

15. The system of claim 11, wherein the one or more actions include initiating a removal request with respect to the subsequently uploaded media item.

16. A non-transitory machine-readable medium having instructions encoded thereon that, when executed by a processing device, cause the processing device to:
determine that a first media item associated with a channel of a channel owner on a media platform is to be used as a reference media item for comparison with other media items to detect any of the other media items that matches the reference media item, wherein to determine that the first media item is to be used as the reference media item, the processing device is further, without user input identifying the first media item as the reference media item, caused to:
determine whether the first media item qualifies as a candidate reference media item based on properties of the first media item and the channel;
responsive to determination that the first media item qualifies as a candidate reference media item, analyze content of the first media item to determine whether the content of the first media item is to be considered as a first content upload to the media platform, wherein determining whether the content of the first media item is to be considered as the first content upload to the media platform comprises determining whether at least a first threshold amount of frames of the first media item does not match with any frame of any previously uploaded media item hosted on the media platform; and
responsive to determining that the content of the first media item is to be considered as the first content upload to the media platform, select the first media item as the reference media item;
upon determining, without the user input identifying the first media item as the reference media item, that the first media item is to be used as the reference media item, detect a subsequently uploaded media item that includes at least a second threshold portion of the reference media item identified without the user input; and provide a graphical user interface (GUI) for presentation to the channel owner, the GUI including a media identifier associated with the subsequently uploaded media item and one or more actions to be initiated by the channel owner with respect to the subsequently uploaded media item.

17. The non-transitory machine-readable medium of claim 16, wherein the processing device is further to:

identify a set of partially matched media items, each media item in the set comprising at least a third threshold portion of the reference media item, wherein the third threshold portion is less than the second threshold portion and a first minimum number of media items have been removed from the media platform due to removal requests associated with the reference media item; and provide to the channel owner, in the GUI, media identifiers associated with each media in the set of partially matched media items.

18. The non-transitory machine-readable medium of claim 17, wherein the set comprises a second minimum number of media items.

19. The non-transitory machine-readable medium of claim 16, wherein the one or more actions include sending an electronic notification to a user that uploaded the subsequently uploaded media item, the electronic notification including an attribute associated with the reference media item to be included with the subsequently uploaded media item.

20. The non-transitory machine-readable medium of claim 19, wherein the attribute included with the subsequently uploaded media item is not removable from the subsequently uploaded media item by the user that uploaded the subsequently uploaded media item.

\* \* \* \* \*